US007136495B1

(12) United States Patent
Tanaka et al.

(10) Patent No.: US 7,136,495 B1
(45) Date of Patent: Nov. 14, 2006

(54) LOUDSPEAKER DEVICE

(75) Inventors: Hidekazu Tanaka, Matsusaka (JP); Fumiyasu Konno, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 740 days.

(21) Appl. No.: 10/089,884

(22) PCT Filed: Aug. 7, 2000

(86) PCT No.: PCT/JP00/05271

§ 371 (c)(1),
(2), (4) Date: Jul. 10, 2002

(87) PCT Pub. No.: WO02/13573

PCT Pub. Date: Feb. 14, 2002

(30) Foreign Application Priority Data

May 19, 1999 (JP) ................................ 11-138191

(51) Int. Cl.

| | |
|---|---|
| ***H04R 3/00*** | (2006.01) |
| ***H04R 29/00*** | (2006.01) |
| ***H04R 27/00*** | (2006.01) |
| ***H04B 15/00*** | (2006.01) |

(52) U.S. Cl. ............................ 381/96; 381/59; 381/83; 381/93

(58) Field of Classification Search .................. 381/96, 381/95, 59, 83, 93

See application file for complete search history.

(56) References Cited

U.S. PATENT DOCUMENTS 3,798,374 A * 3/1974 Meyers ........................ 381/96
6,122,385 A * 9/2000 Konno et al. ................. 381/96

FOREIGN PATENT DOCUMENTS

| | | |
|---|---|---|
| EP | 0 951 201 | 10/1999 |
| JP | 59-90491 | 5/1984 |
| JP | 7-162990 | 6/1995 |
| JP | 7-162990 A * | 6/1995 |

* cited by examiner

*Primary Examiner*—Vivian Chin
*Assistant Examiner*—Douglas Suthers
(74) *Attorney, Agent, or Firm*—Wenderoth, Lind & Ponack, L.L.P.

(57) ABSTRACT

A loudspeaker device comprising a power amplifier (13) to which an input signal is delivered via a subtracter (6), a speaker unit (1) for reproducing output signals delivered from the power amplifier (13), an acoustic pipe (2) coupled in front of the speaker unit for guiding the sound waves, a microphone (4) for detecting an acoustic outputs radiated from the speaker unit, a microphone amplifier (5) for amplifying an acoustic output signals detected by the microphone, and a negative feedback circuit. Output signals of the microphone amplifier are delivered to the subtracter, at the same time the same output signal is connected to a high-pass filter (7) to be delivered to the subtracter. Thus the negative feedback circuit is formed to suppress peaks and dips for providing a flattened sound pressure frequency characteristic.

3 Claims, 7 Drawing Sheets

FIG. 6
FIG. 6 (A)
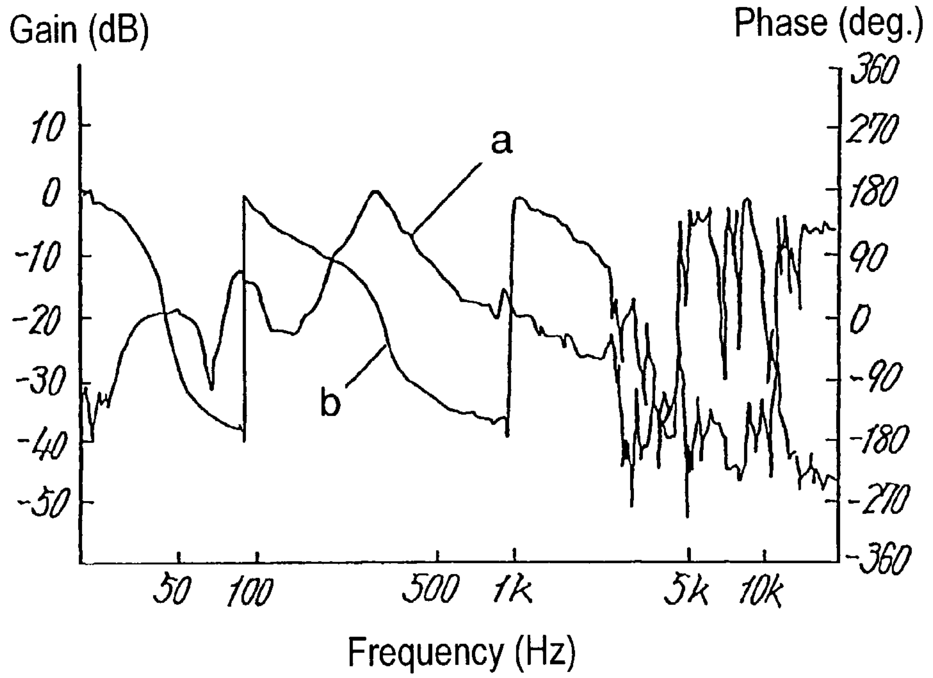
FIG. 6 (B)
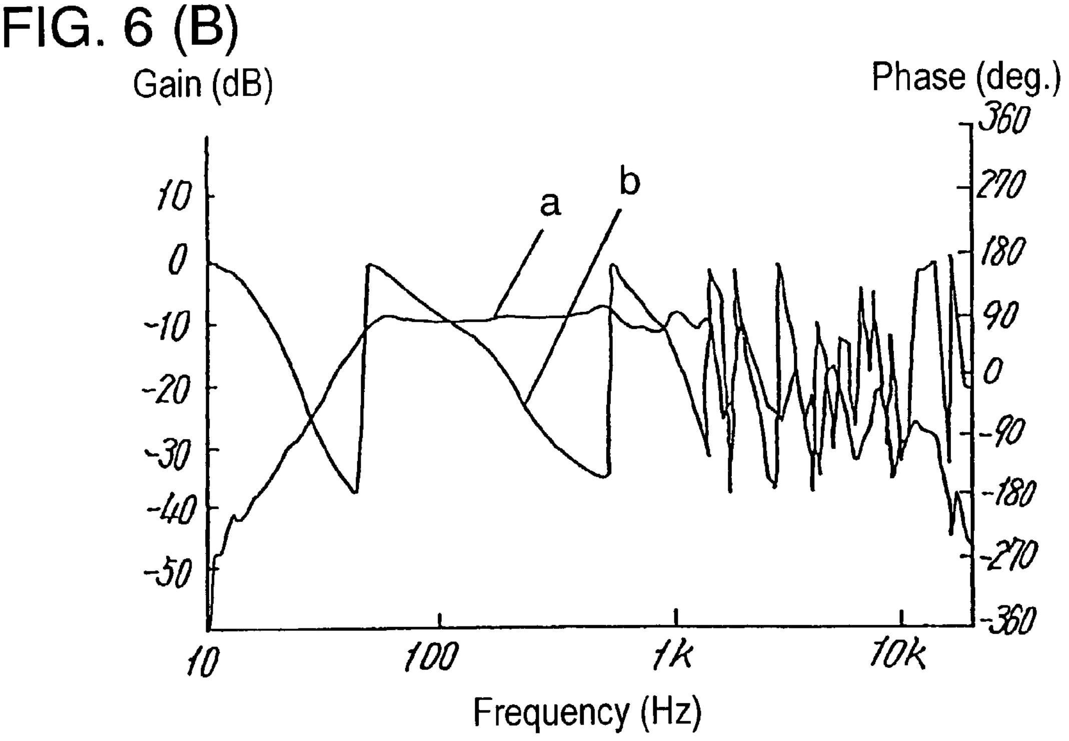

LOUDSPEAKER DEVICE

FIELD OF THE INVENTION

The present invention relates to a loudspeaker (speaker) device for use in various acoustic apparatus and television receivers; more specifically, a speaker unit coupled with an acoustic pipe disposed in front of the speaker, wherein the acoustic pipe has a microphone for detecting sounds reproduced by the speaker unit, and sounds from the speaker unit are corrected in accordance with the signals detected by the microphone.

BACKGROUND OF THE INVENTION

A conventional speaker device of the same type is described with reference to FIG. 7, FIG. 8 (A) and FIG. 8 (B). FIG. 7 is a block diagram, FIG. 8 (A) shows microphone output signals, FIG. 8 (B) shows sound output characteristics of the conventional speaker device, where, curve “a” shows a sound pressure characteristic, and curve “b” shows a phase characteristic.

Referring to FIG. 7, a speaker unit 1 generates sound waves, and the speaker unit 1 is coupled with an acoustic pipe 2. At both sides of the acoustic pipe 2 are sound absorbing material (not shown) provided for suppressing resonance. Inside the acoustic pipe 2, a microphone 4 is provided close to the speaker unit 1 for detecting sound output signals.

When a signal is delivered to the speaker unit 1 via a subtracter 6 and a power amplifier 3, the speaker unit 1 radiates acoustic output, which is radiated from the opening through the acoustic pipe 2. The standing wave due to the length of the acoustic pipe 2 and the one generated within the acoustic pipe 2 causes a speaker device to reproduce sounds having steep peaks and dips in the sound pressure frequency characteristic. In order to prevent this, a sound absorbing material is employed to suppress the standing waves. However, the sound absorbing material is not effective enough to suppress the standing waves completely. So, a microphone 4 detects the remaining standing wave and feeds it back to the subtracter 6 via a microphone amplifier 5. Thus, the standing wave in acoustic pipe 2 is suppressed, and the reproduced sounds with a flat sound pressure frequency characteristic are obtained.

An acoustic pipe coupled in the front of a speaker unit is known to produce a resonance in the pipe; the resonance frequency f generated is represented by the formula below:

$$f=(n+1)C/4L$$

where; f: pipe resonance frequency, n: the n-th resonance, C: sound velocity, L: length of the pipe.

In the above configured speaker device, when a primary resonance (n=1) due to the pipe length is corrected by means of the phase difference between the electrical input signal delivered to the speaker unit 1 and the sound output signal radiated from the speaker unit 1, the resonance component shifts and appears as a peak in the sound output characteristic after the correction. So, it has been difficult to flatten the sound output characteristic. Furthermore, since the feedback is performed for an entire frequency range from a low frequency component to a high frequency component, it is impossible to control a certain desired frequency component.

The relationship between the input and the output is shown below:

$$V\text{ out}/V\text{ in}=A/(1+A\cdot T(S))$$

where; V out: output voltage, V in: input voltage, A: total amplification by amplifiers, T (S) transfer function.

Assuming that the microphone 4 has an approximately flat characteristic and the T (S) is substantially equal to the transfer function of the speaker unit 1, the T (S) becomes minus 1 as a result of phase shift caused by the speaker unit 1 and the second, or the third, pipe resonance of acoustic pipe 2.

Namely, in some cases the denominator becomes 0 to be ready for making oscillation. This makes it difficult to apply too many feedbacks taking an oscillation margin into consideration, and to effectively control a low frequency region and a pipe resonance.

The present invention addresses the above problems and aims to provide a speaker device that has stable characteristics.

SUMMARY OF THE INVENTION

A speaker device of the present invention comprises a power amplifier which receives input signal via subtracter, a speaker unit for reproducing output signal of the power amplifier, an acoustic pipe coupled to the speaker unit in the front for guiding sound waves generated by the speaker unit, a microphone for detecting acoustic outputs radiated from the speaker unit, and a microphone amplifier for amplifying acoustic output signals detected by the microphone. In a speaker device having the above-described configuration, output signals of the microphone amplifier are delivered to the subtracter, and, at the same time, output signals of the above microphone amplifier are delivered via a high-pass filter also to the substracter to form a negative feedback circuit in order to suppress peaks and dips in the sound pressure frequency characteristics. Thus, the speaker device is provided with stable characteristics.

BRIEF DESCRIPTION OF THE DRAWINGS

FIG. 4 (B) shows an acoustic output characteristic in accordance with another embodiment of the present invention.

FIG. 6 (A) shows a microphone output signal characteristic in accordance with still another embodiment of the present invention.

FIG. 6 (B) shows a sound output characteristic in accordance with still another embodiment of the present invention.

FIG. 8 (B) shows sound output characteristics.

DETAILED DESCRIPTION OF THE INVENTION

Figure 1:
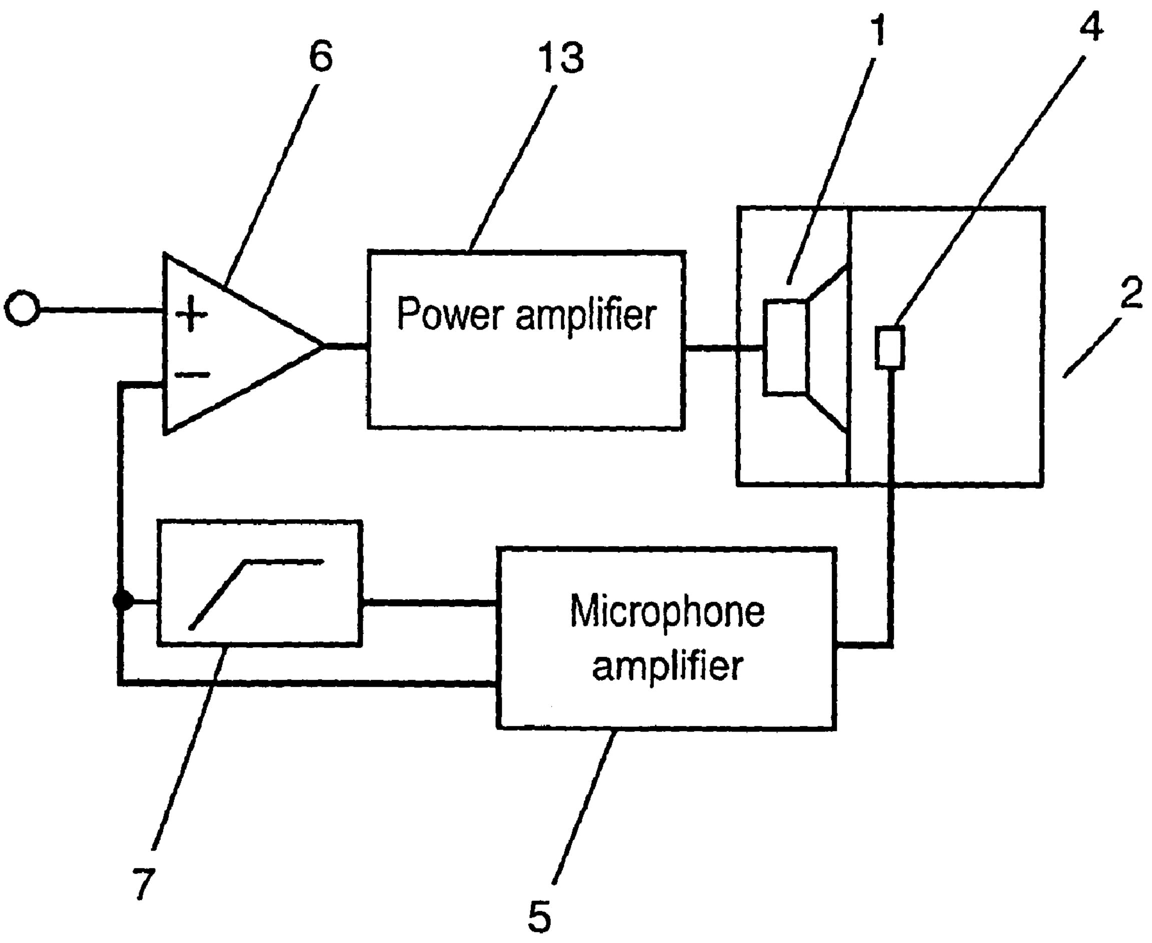
FIG. 1 shows a block diagram of a speaker device in accordance with an exemplary embodiment of the present invention.

Now in the following, exemplary embodiments of the present invention are described referring to the drawings FIG. 1 through FIG. 6 (B).

Those components having the same functions as those of the conventional technology are represented by the same reference numerals used for describing the conventional speaker device.

First Embodiment

Figure 2:
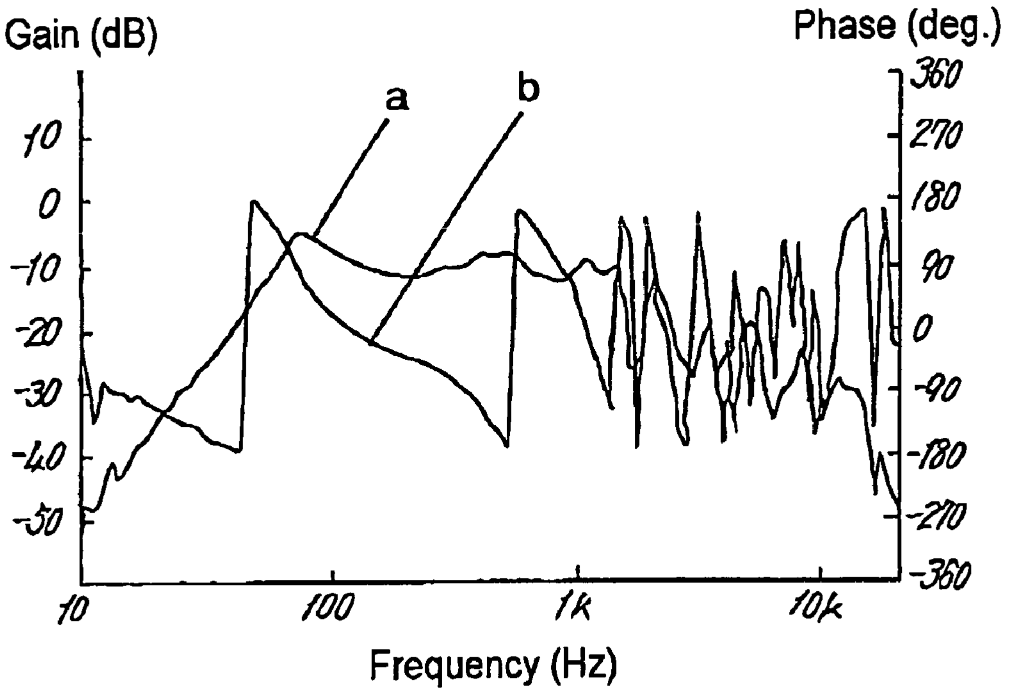
FIG. 2 shows an acoustic output characteristic.

FIG. 1 shows a block diagram of an acoustic circuit in accordance with a first exemplary embodiment of the present invention. FIG. 2 is a sound output characteristic chart; where, curve "a" shows the sound pressure characteristic, while curve "b" shows the phase characteristic. Initially, the overall structure of the speaker device is described referring to FIG. 1.

Referring to FIG. 1, in front of a speaker unit 1 an acoustic pipe 2 is coupled to the speaker unit 1, and a microphone 4 is mounted within the acoustic pipe 2. Sound waves radiated from the speaker unit 1 are detected by the microphone 4 within the acoustic pipe 2. The detected signals are delivered to a subtracter 6 via a high-pass filter 7, and at the same time, the signals detected by the microphone 4 are input directly to the subtracter 6 to be mixed with input signals coming from outside in order to correct the input signals. The corrected signals are amplified at a power amplifier 13 and delivered to the speaker unit 1.

The acoustic pipe 2 is disposed in front of a speaker box (not shown) in which the speaker unit 1 is mounted, and sound waves are guided by the acoustic pipe 2 to be radiated from a narrow slit opening having a rectangular shape. The microphone 4 detects resonance in the acoustic pipe 2, and feeds an acoustic output signals thus detected back to the subtracter 6 via a secondary high-pass (−12 dB/oct) filter 7. At the same time, the acoustic output signals are fed back directly to the subtracter 6.

FIG. 2 shows a sound output characteristic. As compared with FIG. 8 (B), which shows the conventional counterpart, the peak due to a shift of resonance component caused by phase shift is not seen in FIG. 2. Frequency characteristics of a speaker device in the present embodiment have been flattened, without having a shift of the resonance component.

As described above, the resonance in the acoustic pipe 2 is detected by microphone 4, and the acoustic output signals thus detected are delivered via the secondary high-pass filter 7 (−12 dB/oct) to the subtracter 6 as the feedback. At the same time, the signals detected by the microphone 4 are also delivered directly to the subtracter 6. Further, a cutoff frequency of secondary high-pass filter 7 (−12 dB/oct) is set to match with the resonance frequency of the pipe. By so doing, the phase correction is performed and a superior speaker device is provided.

Second Embodiment

Figure 3:
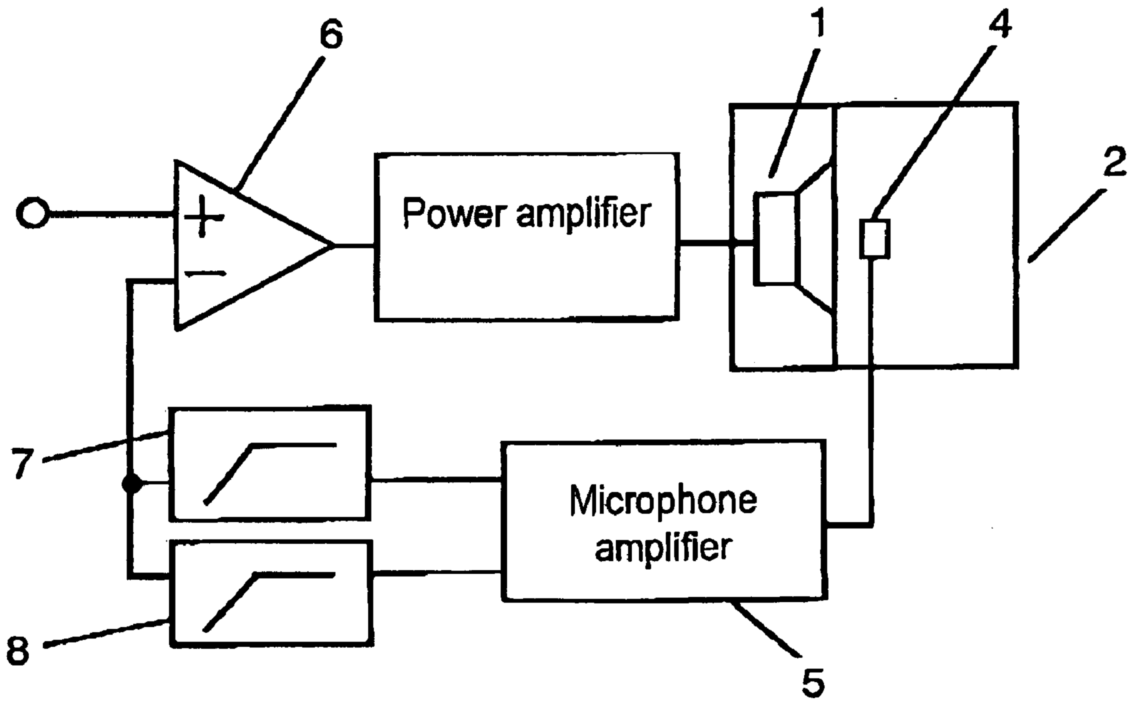
FIG. 3 shows a block diagram of a speaker device in accordance with another embodiment of the present invention.
Figure 4:
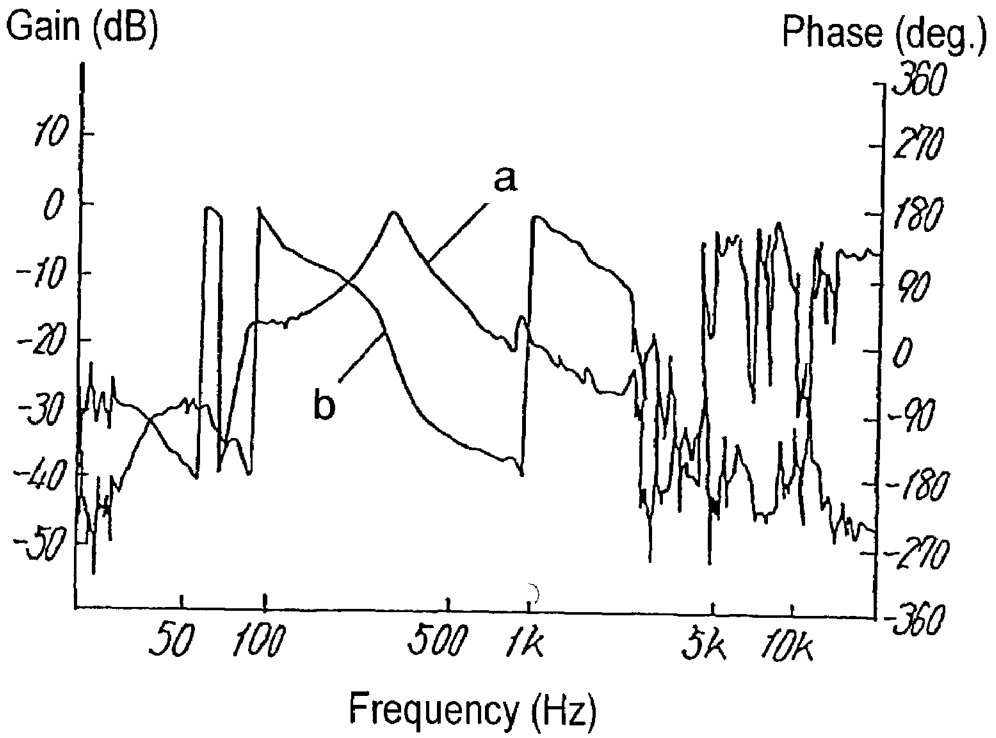
FIG. 4 (A) shows a microphone output signal characteristic in accordance with another embodiment of the present invention.
Figure 4:
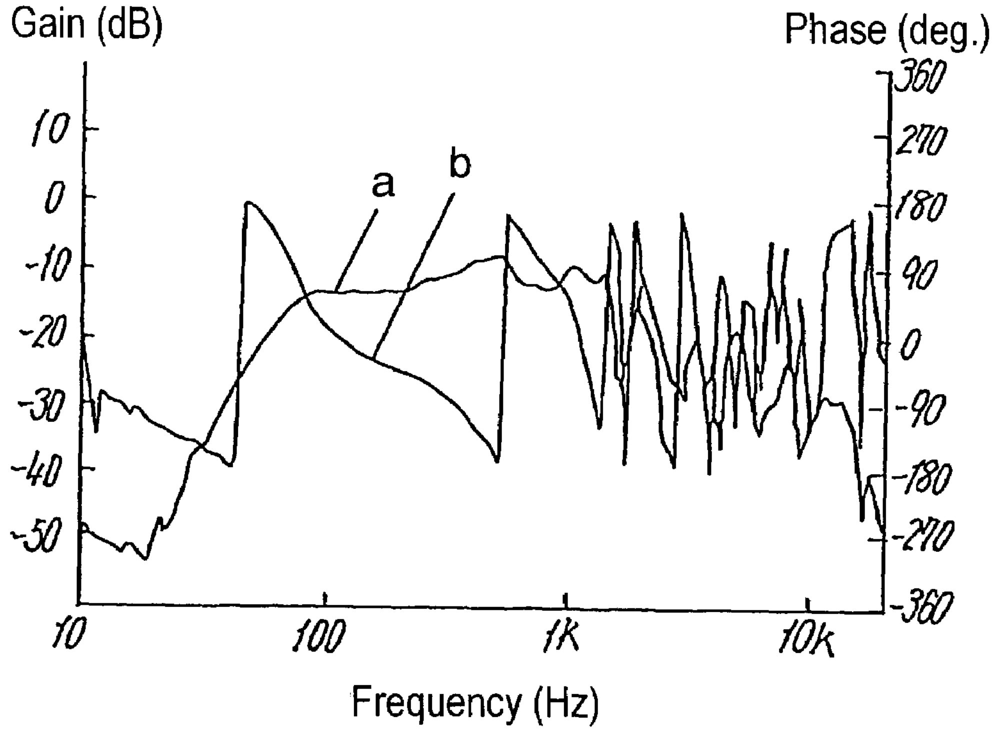

FIG. 3 shows a block diagram of a sound circuit in accordance with a second exemplary embodiment of the present invention. FIG. 4 (A) shows a microphone output signal characteristic, FIG. 4 (B) shows acoustic output characteristics, where, curve "a" shows a sound pressure characteristic, while curve "b" shows a phase characteristic. A difference compared to the first embodiment is that a negative feedback circuit in the present embodiment is formed by delivering the acoustic output signals detected by microphone 4 to the subtracter 6 via a couple of high-pass filters 7 and 8 connected in parallel. The filter 7 is the secondary high-pass filter (−12 dB/oct), while the filter 8 is the primary high-pass filter (6 dB/oct).

Figure 8:
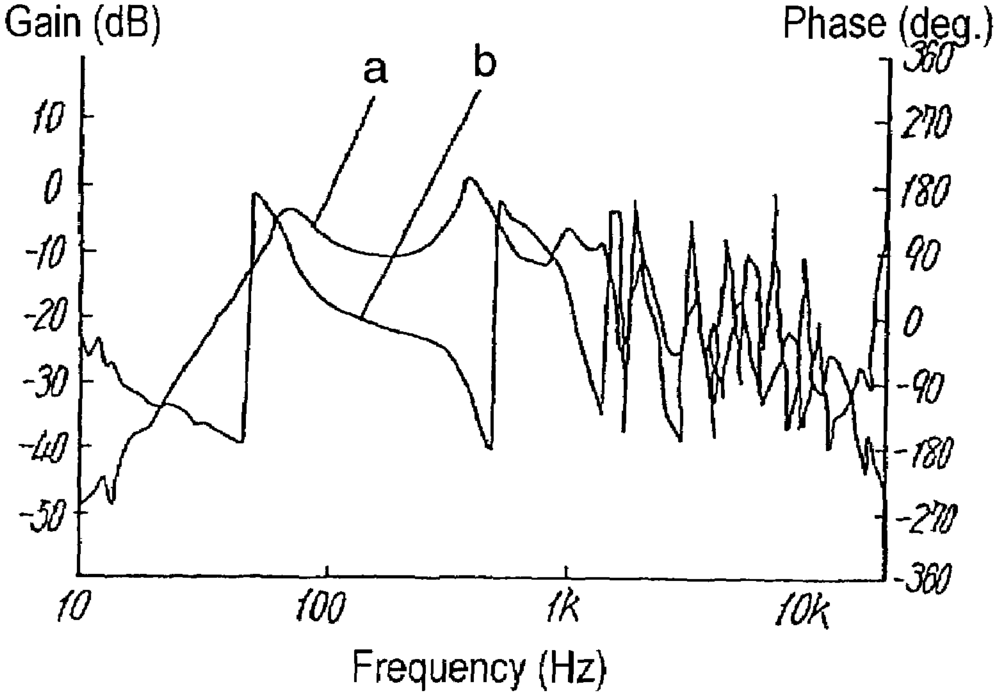
FIG. 8 (A) shows a microphone output signal characteristic.
Figure 8:
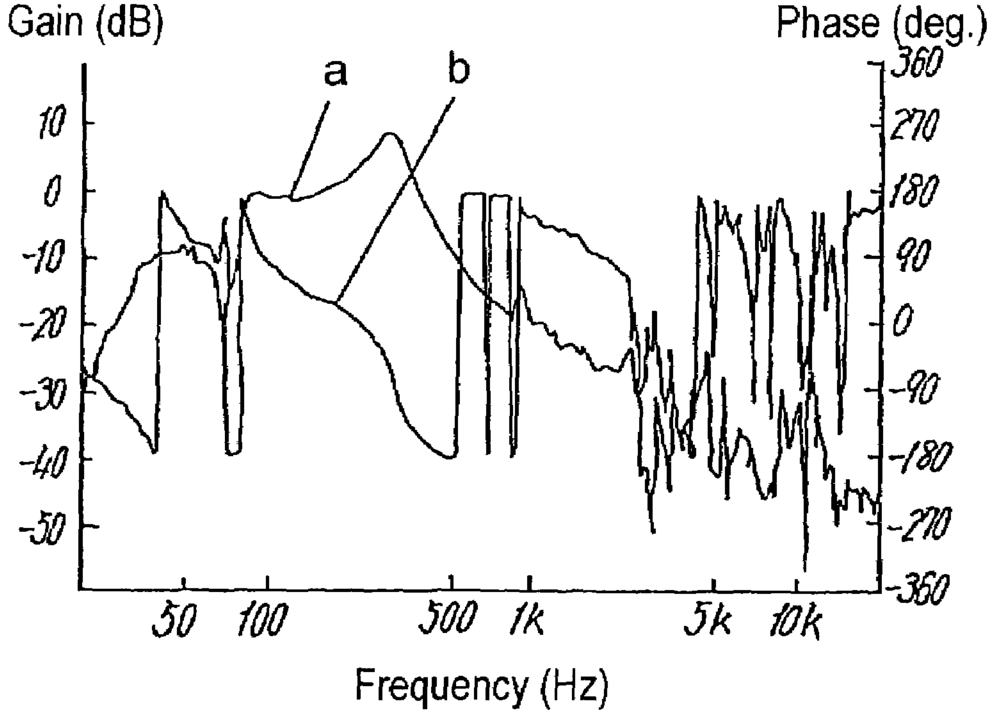

According to FIG. 8 (A), which shows the frequency characteristic of the microphone signal of the conventional device, the feedback is performed covering even the low frequency region components, which means the low frequency region components are enhanced. In the present embodiment, however, the level of low frequency region components is lowered as shown in the characteristic chart, as is shown in FIG. 4 (A). This means that the low frequency region components are not enhanced in the present embodiment.

When the output sound characteristics of the present embodiment (FIG. 4 (B)) are compared with those of the conventional device (FIG. 8 (B)), it is seen that no enhancement is given to the low frequency characteristic in the present embodiment, whereas the characteristic of the conventional device has been enhanced.

As described above, the negative feedback circuit in the present embodiment is provided with a couple of primary and secondary high-pass filters 8 and 7 connected in parallel, and output signals of the microphone amplifier 5 are connected thereto to be delivered to the subtracter 6. The circuit can feed back those microphone output signals only in the vicinity of the resonance frequency component, so, the enhancement of the low frequency region components is suppressed. Thus, the output frequency characteristics can be flattened and corrected, and a speaker device of superior sound characteristics is provided.

Third Embodiment

Figure 5:
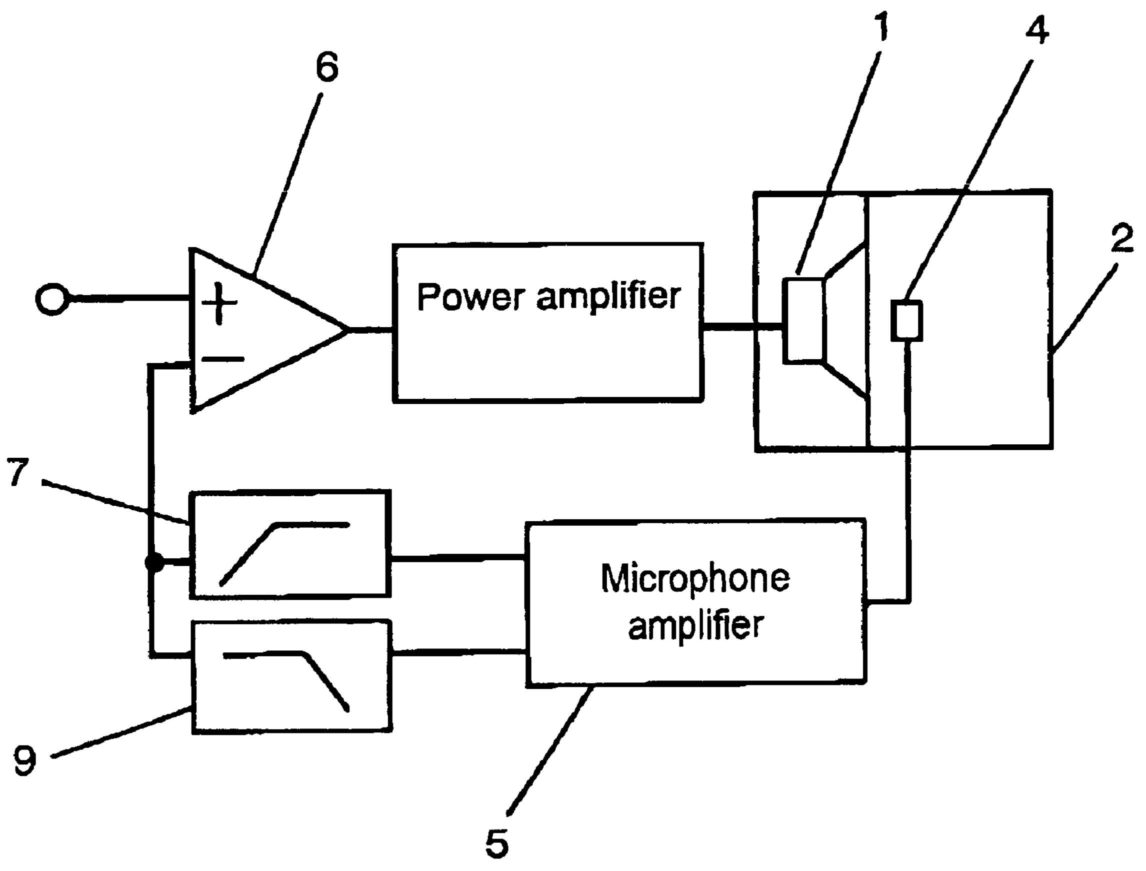
FIG. 5 shows a block diagram of a speaker device in accordance with still another embodiment of the present invention.
Figure 7:
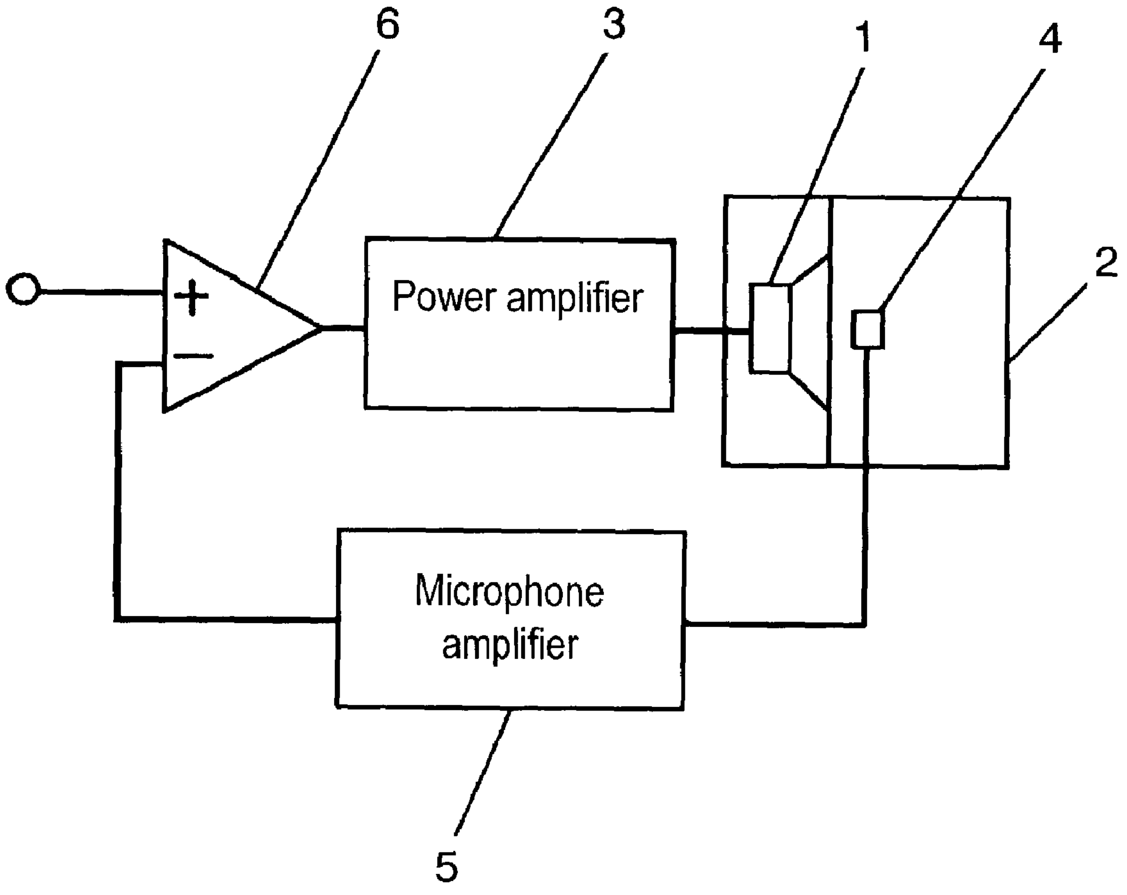
FIG. 7 shows a block diagram.

FIG. 5 shows a block diagram of a sound circuit in accordance with a third exemplary embodiment of the present invention. FIG. 6 (A) shows the microphone output signal characteristics, FIG. 6 (B) shows the sound output characteristics, where, curve "a" shows the sound pressure characteristic, while curve "b" shows the phase characteristic. A difference compared to the first embodiment is that a negative feedback circuit in the present embodiment is formed of a couple of filters 7 and 9. A secondary high-pass filter 7 for processing the output signal detected by the microphone 4 and delivering to the subtracter 6, and a low-pass filter 9 of −12 dB/oct, or −6 dB/oct, for processing the output signal detected by the microphone 4 and delivering to the subtracter 6.

The low-pass filter 9 can take out only the low frequency region components for phase correction. Thus, the output sound characteristic can be corrected for the low frequency region components alone. The secondary high-pass filter 7 can correct the acoustic pipe resonance independently and arbitrarily. In this way, the output frequency characteristics can be flattened and corrected easily and arbitrarily, and a speaker device of superior sound characteristics is provided in accordance with the present embodiment.

When the sound output characteristics of the present embodiment FIG. 6 (B) are compared with those of the conventional device FIG. 8 (B), it may be clearly understood that the low frequency region characteristic and the pipe resonance can be controlled simultaneously, which allows the sound output characteristics to be controlled arbitrary.

Although the descriptions in the above embodiments have been based on the high-pass filters for controlling the secondary resonance in the pipe, the n-th resonance (n being a positive integer) of the pipe can of course be controlled in accordance with the present invention.

Furthermore, the present invention can be applied also to those speaker devices whose back cover for coupling with the acoustic pipe is a bass reflective type, or having no back cover at all.

INDUSTRIAL APPLICABILITY

The speaker devices of the present invention comprise a power amplifier which receives an input signal via a subtracter, a speaker unit for reproducing an output signal of the power amplifier, an acoustic pipe coupled in a front of the speaker unit for guiding sound waves from the speaker unit, a microphone for detecting acoustic outputs radiated from the speaker unit, and a microphone amplifier for amplifying the sound output signals detected by the microphone. The speaker device, which has a negative feedback circuit formed by direct connection of the output signal of the microphone amplifier to the subtracter and by connection of the above output signal of the microphone amplifier via a high-pass filter to the subtracter, makes the phase correction and suppresses the peak due to a shift of resonance frequency component, and the shift is caused by a phase change. The direct feedback of microphone output signal enables the low frequency region components to be enhanced. The output frequency characteristics are thus flattened and the low frequency sound reproduction is improved so as to provide a speaker device of superior sound characteristics.

In the feedback circuit where a secondary high-pass filter is used for the high-pass filter, remarkable effects are provided by matching the cutoff frequency with the resonance frequency.

In a speaker device comprising a power amplifier that receives an input signal via a subtracter, a speaker unit for reproducing an output signal from the power amplifier, an acoustic pipe coupled to a front of the speaker unit for guiding sound waves, a microphone for detecting acoustic outputs radiated from the speaker unit, and a microphone amplifier for amplifying acoustic output signals detected by the microphone, and a negative feedback circuit formed of a couple of primary and secondary high-pass filters disposed in parallel for connecting the output signals from the microphone amplifier to the subtracter, the microphone output signals can be fed back only in the vicinity of the resonance frequency component. As a result, an enhancement in the low frequency region components can be suppressed. Thus, the output frequency characteristics can be easily flattened and corrected for providing a speaker device of superior sound characteristics.

In a speaker device comprising a power amplifier that receives an input signal via a subtracter, a speaker unit for reproducing an output signal of the power amplifier, an acoustic pipe coupled in a front of the speaker unit for guiding sound waves, a microphone for detecting sound outputs radiated from the speaker unit, and a microphone amplifier for amplifying the sound output signals detected by the microphone, and a negative feedback circuit formed of a secondary high-pass filter and a primary, or a secondary, low-pass filter disposed in parallel to be connected to the subtracter, the output signals of microphone amplifier can be fed back only in the low frequency component and that at the vicinity of resonance frequency component. The low-pass filter can perform a phase correction for the low frequency region component and a control of low frequency region component. Furthermore, any desired frequency components can be controlled independently, and the resonance frequency component can be controlled while enhancing or suppressing reproduction of the low frequency region. In this way, the output frequency characteristics can be flattened and easily corrected, and a speaker device of superior sound characteristics can be provided.

What is claimed is:

1. A loudspeaker device comprising:

a power amplifier for receiving an input signal via a subtracter;

a speaker unit for reproducing an output signal of said power amplifier;

an acoustic pipe coupled in front of said speaker unit for guiding sound waves reproduced by said speaker unit;

a microphone for detecting acoustic outputs radiated from said speaker unit;

a microphone amplifier for amplifying an acoustic output signal detected by said microphone; and a negative feedback circuit, wherein said negative feedback circuit is formed by inputting an added signal to said subtracter, the added signal being an addition of a first output signal delivered from said microphone amplifier and a second output signal delivered from said microphone and passed through said high-pass filter, and wherein a cutoff frequency of said high-pass filter is matched with a resonance frequency of said acoustic pipe.

2. A loudspeaker device comprising:

a power amplifier for receiving an input signal via a subtracter;

a speaker unit for reproducing an output signal of said power amplifier;

an acoustic pipe coupled in front of said speaker unit for guiding sound waves reproduced by said speaker unit;

a microphone for detecting acoustic outputs radiated from said speaker unit;

a microphone amplifier for amplifying an acoustic output signal detected by said microphone; and a negative feedback circuit, wherein said negative feedback circuit is formed by inputting an added signal to said subtracter, the added signal being an addition of a first output signal delivered from said microphone amplifier and passed through a −12 dB/oct. high-pass filter and a second output signal delivered from said microphone and passed through a −6 dB/oct. high-pass filter, and wherein a cutoff frequency of said −12 dB/oct high-pass filter is matched with a resonance frequency of said acoustic pipe.

3. A loudspeaker device comprising:

a power amplifier for receiving an input signal via a subtracter;

a speaker unit for reproducing an output signal of said power amplifier;

an acoustic pipe coupled in front of said speaker unit for guiding the sound waves;

a microphone for detecting acoustic outputs radiated from said speaker unit;

a microphone amplifier for amplifying an acoustic output signal detected by said microphone; and a negative feedback circuit, wherein said negative feedback circuit is formed by inputting an added signal to said subtracter, the added signal being an addition of a first output signal delivered from said microphone amplifier and passed through a −12 dB/oct. high-pass filter and a second output signal delivered from said microphone and passed through one of a −6 dB/oct. low-pass filter and a −12 dB/oct. low-pass filter, and wherein a cutoff frequency of said −12 dB/oct. high-pass filter is matched with a resonance frequency of said acoustic pipe.

* * * * *